Jan. 3, 1956  K. MAYBACH ET AL  2,729,521
CRANK PIN BEARING FOR CONNECTING RODS
OF INTERNAL-COMBUSTION ENGINES
Filed Nov. 4, 1950
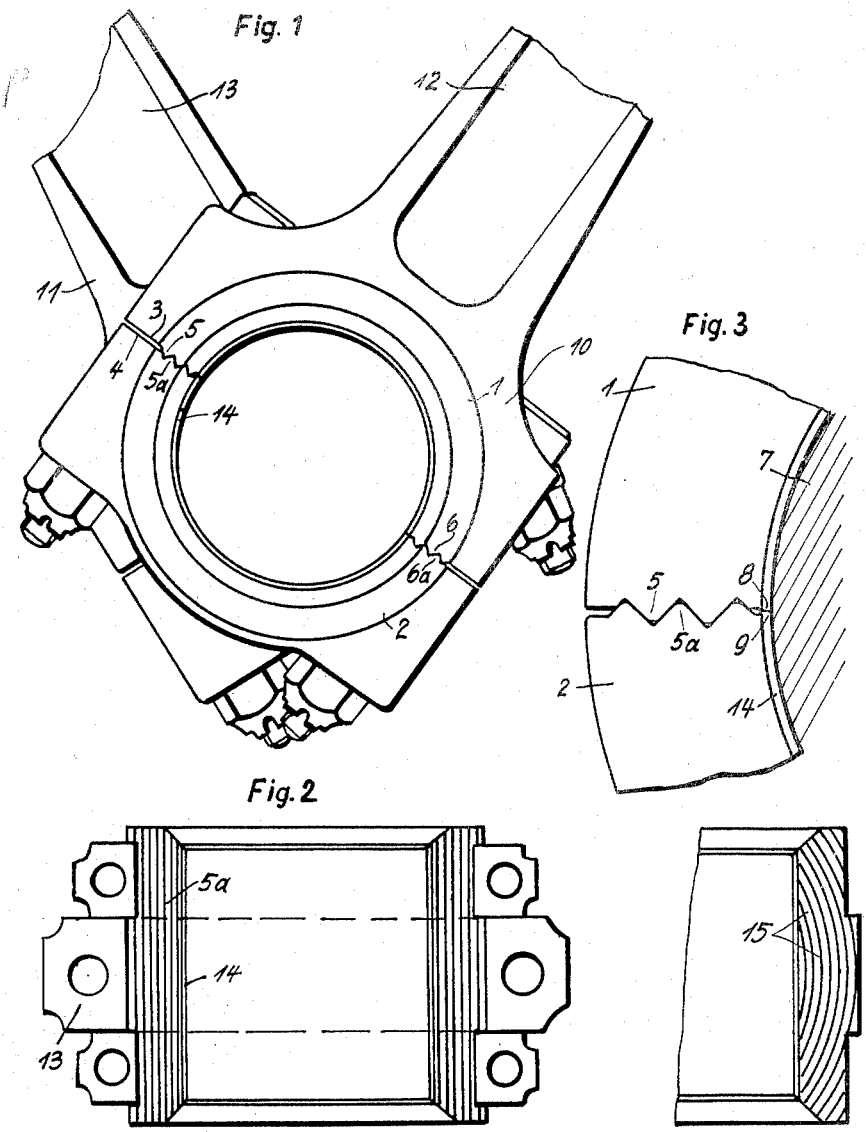
INVENTORS.
KARL MAYBACH.
RICHARD SEIFERT.
GUSTAV MOHR.
BY
K. A. Mayr
ATTORNEY.

United States Patent Office 2,729,521
Patented Jan. 3, 1956

2,729,521

CRANK PIN BEARING FOR CONNECTING RODS OF INTERNAL-COMBUSTION ENGINES

Karl Maybach, Friedrichshafen am Bodensee, Gustav Mohr, Immenstaad am Bodensee, and Richard Seifert, Friedrichshafen-Seemoos, Germany, assignors, by direct and mesne assignments, to Maybach-Motorenbau G. m. b. H., Friedrichshafen, Germany, a firm of Germany Application November 4, 1950, Serial No. 194,044

Claims priority, application Germany March 21, 1950

2 Claims. (Cl. 308—237)

The present invention relates to crank pin bearings for the connecting rods of internal combustion engines, especially for vehicles, and more particularly to bearings of this type having longitudinally split brasses or bushings.

In such bearings, the presence of an uninterrupted oil film under high hydraulic pressure at all operating conditions is essential. There should be no possibility for the pressure to diminish at any part of the brasses as will occur if the oil can escape through clearances between the adjoining faces of the brasses. To avoid this, the joints between the brasses or bushes have been arranged in conventional designs in the zone of minimum oil pressure at maximum load, so that the high pressure zone of the oil film does not communicate with the joint.

The zone of maximum oil film pressure travels back and forth along the circumference of the crank pin in a manner depending on the construction of the engine. This change of pressure is greatest if several connecting rods are borne by a common bushing as in engines having a plurality of cylinders in a row and forked connecting rods. For example, in twelve-cylinder V-engines, when the engine idles, the maximum bearing pressure is at a part of the bearing surface different from that part where it is when the engine operates at full load, so that the high pressure portion of the oil film communicates with the joint between the bushings, causing a considerable reduction of bearing capacity of the oil film because its pressure falls or even causing running dry and destruction of the bearing. If one connecting rod is forked and the bearing of another is arranged between the prongs of the fork, the fork may be spread causing, at the rapid change of direction of the highest stresses in the brasses, a continual slight deformation of the latter in the direction of the greatest force, so that the edges of the brasses are radially displaced. The resulting scraping effect of the edges of the bearing on the pin reduces the supporting oil film, and small shavings may be produced which cause abrasions or cuts in the bearing.

This deformation of the brasses is greatest when the engine idles at high speed; however, similarly unfavorable bearing stresses also occur during the suction and exhaust stroke when operating under load. Under these conditions, the mass forces are predominant and cause tension and pressure forces which act on the joints of the bearing at unfavorable angles and reduce rigidity of split bearings.

If bearings of this type are disassembled and re-assembled several times, the interior edges usually do not come into the exact original position and protrude, producing the aforedescribed undesired conditions. Fixing by set pins is difficult because of limited space and is not satisfactory as such means yield, and an edge projecting ever so little scrapes off the oil film.

It has been proposed to corrugate adjoining bearing faces for increasing the stability of split bearings. This does not eliminate gaping of the joints caused by deformation and damage due to weakening of the effect of the oil film. Tightening of the connecting bolts does not produce sufficient frictional engagement of the bushings.

The same disadvantages are inherent in other conventional designs in which the corrugations extend over the adjoining faces of the bearing bodies and of the brasses. In these constructions the corrugations of the bearing body must be produced together with those of the brasses and the latter are not exchangeable.

It is an object of the present invention to provide an improved connecting rod crank pin bearing which avoids the aforedescribed difficulties by corrugating the adjacent faces of the brasses or bushes and leaving the neighboring faces of the parts of the bearing body plane and spaced. Brasses according to the invention form a body which is rigid in radial direction and acts as if it had no joint. No oil can escape even if the pressure zone of the oil film coincides with the joint under certain operating conditions, and a sufficiently heavy oil film is maintained at all times so that bearing damages due to insufficient lubrication are eliminated, even in continued long-time operation at various loads. Relative displacement of the brasses and scraping of the latter against the crank pin is made impossible by the construction according to the invention.

The corrugations are preferably parallel to the rotation axis of the bearing. This facilitates manufacture. The corrugations, however, may be arranged differently without departing from the scope of the present invention; for example, they may extend at an angle to the rotation axis of the bearing or they may be arcuate with the center of the arc at a distance from the rotation axis to prevent relative axial displacement of the brasses or bushes. In the latter case, the corrugations are longer and their effect is greater. According to the invention, the corrugations have a triangular cross-section, the angle of the edge preferably amounting to 90 degrees.

According to the invention, the corrugated surfaces continue into spaced radial surfaces adjacent to the bearing surface of the brasses, affording more effective pressing together of the faces of the brasses at their joints. If the bushings are provided with a lining, the adjacent faces of the lining are preferably plane and radial. If the lining is of suitable size, the adjoining surfaces will be so compressed that the bearing surface is, in fact, continuous.

Since the oil film is maintained with the construction of the bushings according to the invention, oil grooves can be omitted and a continuous oil film of equal thickness and high support capacity is produced.

Though the invention is of foremost importance for engines having a plurality of cylinder rows and in which a piston rod is also carried on the back of the brasses, the construction according to the invention is also of advantage in connection with engines having single connecting rods.

Further and other objects of the present invention will be hereinafter set forth in the accompanying specification and claims, and shown in the drawings which, by way of illustration, show what we now consider to be preferred embodiments of our invention.

In the drawings:

Fig. 1 is a side view of two connecting rod heads according to the invention;

Fig. 2 is a plan view of one half of a connecting rod crank pin bearing according to the invention;

Fig. 3 is an enlarged side view of the joint of the brasses according to the invention;

Fig. 4 is a plan view of a modified bushing face according to the invention.

Like parts are designated by like numerals in all figures of the drawings.

Referring more particularly to the drawing, numerals 1 and 2 designate the brasses of a connecting rod bearing according to the invention. They are seated in the heads 10 and 11 of the connecting rods 12 and 13. Connecting rod 12 is forked and rod 13 extends between the prongs of the fork and is borne on the backs of brasses 1 and 2. The latter are pressed into the head of the rod 12 and secured against turning in any conventional manner, for example by a pin. There is a clearance between the neighboring faces 3 and 4 of the bearing body. The adjoining faces of the bushing halves or brasses 1 and 2 are provided with exactly fitting corrugations 5, 6 and 5a, 6a, respectively. As seen in Fig. 3, the corrugations have a triangular cross-section, the angle at the edge being about 90 degrees.

The corrugations continue into a radial, plane surface at the side of the bearing surface which surface is closer to the bottom of the grooves than to the crests of the corrugations, so that there is a space between the plane surfaces of opposed bushing parts. The bearing may be provided with a lining 14 in which the adjoining surfaces 8 and 9 are radial. Because the material of which the lining is made is relatively soft, its adjoining faces can be pressed together to such an extent that a continuous bearing surface is produced having no noticeable interruption.

Fig. 4 illustrates a modified configuration of the adjoining faces of brasses having corrugations 15 following portions of circles. Corrugations so formed produce a more rigid connection of the brasses 1 and 2, in certain applications of the invention.

The number of corrugations depends on the load conditions and on the available width of the adjoining faces of the brasses. In the construction according to the invention, the entire pressure of the connecting bolts is transferred to the brasses, and it is therefore possible to use smaller bolts than usual.

The brasses 1 and 2 according to the invention, which are pressed into the head of rod 12, form a rigid bearing body which not only prevents fading of the oil film adjacent to the joint but also eliminates permanent deformation of the brasses and gaping of the joints. Assembly and disassembly of split bearings according to the invention is as simple and the bearings are as rigid as one-piece bearings. Bearings according to the invention can take a much greater load than conventional bearings.

While we believe the above described embodiments of our invention to be preferred embodiments, we wish it to be understood that we do not desire to be limited to the exact details of design and construction shown and described, for obvious modifications will occur to a person skilled in the art.

We claim:

1. A bushing for a crank pin bearing for internal combustion engines, said bushing being split into two halves, each half having a substantially radial surface facing and being spaced from a corresponding surface of the other half, and corrugations provided on each of said surfaces and extending in substantially axial direction, the crests of the corrugations on the surface of one half fitting tightly into the grooves of the corrugations of the other half, and the crests of said corrugations projecting farther from said surfaces than the bottoms of the grooves of said corrugations are recessed from said surfaces.

2. A bushing as defined in claim 1, comprising, in combination, a lining disposed in each bushing half for forming a bearing surface, said linings having plane radial adjoining faces.

References Cited in the file of this patent

UNITED STATES PATENTS

| | | |
|---|---|---|
| 758,397 | Weiss | Apr. 26, 1904 |
| 1,037,211 | DeDion et al. | Sept. 3, 1912 |
| 1,581,083 | Gilman | Apr. 13, 1926 |
| 1,831,430 | Weis | Nov. 10, 1931 |
| 2,311,434 | Dusevoir | Feb. 16, 1943 |
| 2,446,090 | Holloway | July 27, 1948 |

FOREIGN PATENTS

| | | |
|---|---|---|
| 896,339 | France | Apr. 24, 1944 |